(12) United States Patent
Endo et al.

(10) Patent No.: US 7,163,762 B2
(45) Date of Patent: Jan. 16, 2007

(54) POLYMER ELECTROLYTE BATTERY AND METHOD OF PRODUCING SAME

(75) Inventors: Takahiro Endo, Kanagawa (JP); Koichiro Kezuka, Miyagi (JP); Kazuhito Hatta, Fukushima (JP); Takayuki Kondo, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/181,504

(22) PCT Filed: Nov. 21, 2001

(86) PCT No.: PCT/JP01/10183

§ 371 (c)(1),
(2), (4) Date: Oct. 7, 2002

(87) PCT Pub. No.: WO02/43178

PCT Pub. Date: May 30, 2002

(65) Prior Publication Data

US 2003/0108787 A1 Jun. 12, 2003

(30) Foreign Application Priority Data

Nov. 21, 2000 (JP) .............................. 2000-354871

(51) Int. Cl.
*H01M 4/00* (2006.01)
*H01M 6/14* (2006.01)
(52) U.S. Cl. ........................ 429/94; 429/300; 429/306; 429/163; 429/177

(58) Field of Classification Search ................. 429/94, 429/162, 300, 163, 176, 185, 186, 127, 131, 429/179; 428/72, 212, 343, 542.8, 461, 516
See application file for complete search history.

(56) References Cited

U.S. PATENT DOCUMENTS

| | | | |
|---|---|---|---|
| 2,706,214 A | 4/1955 | Arbogast | |
| 5,188,909 A | 2/1993 | Pedicini et al. | |
| 5,922,493 A | 7/1999 | Humphrey, Jr. et al. | |
| 6,048,639 A | 4/2000 | Sonozaki et al. | |
| 6,287,719 B1* | 9/2001 | Bailey | ........................ 429/94 |
| 2002/0142178 A1* | 10/2002 | Yamashita et al. | .......... 428/461 |
| 2002/0160212 A1* | 10/2002 | Yamashita et al. | .......... 428/458 |
| 2004/0029001 A1* | 2/2004 | Yamazaki et al. | .......... 429/176 |

FOREIGN PATENT DOCUMENTS

EP     0670605     9/1995

(Continued)

*Primary Examiner*—Raymond Alejandro
(74) *Attorney, Agent, or Firm*—Sonnenschein Nath & Rosenthal LLP (57) ABSTRACT

In a polymer electrolyte battery including a battery element having a cathode and an anode coiled through a polymer electrolyte, a section of the battery element perpendicular to the coiling axis has a curved form. As compared with a polymer electrolyte battery having a flat plate type battery element curved, the former battery has an extremely low possibility of short-circuit at the end of an electrode and excellent battery characteristics.

8 Claims, 9 Drawing Sheets

FOREIGN PATENT DOCUMENTS

| | | |
|---|---|---|
| EP | 0928035 | 7/1999 |
| EP | 0996179 | 4/2000 |
| JP | 6-181069 | 6/1994 |
| JP | 8-195204 | 7/1996 |
| JP | 10-199493 * | 7/1998 |
| JP | 10-302827 | 11/1998 |
| JP | 11-307130 * | 5/1999 |
| JP | 11-162476 | 6/1999 |
| JP | 11-307130 | 11/1999 |
| JP | 2000-294296 | 10/2000 |
| JP | 2001-176459 * | 6/2001 |
| WO | WO00/13252 | 3/2000 |

* cited by examiner

POLYMER ELECTROLYTE BATTERY AND METHOD OF PRODUCING SAME

BACKGROUND OF THE INVENTION

The present invention relates to a polymer electrolyte battery having a battery element in which a cathode and an anode are coiled through a polymer electrolyte and a method for manufacturing it, and more particularly to an improvement of the form of the battery element.

BACKGROUND ART

In recent years, as portable electronic devices are made compact and the weight of them are reduced, it has been highly demanded for batteries which supply electric power to these electronic devices to decrease their size, thickness or weight irrespective of uses thereof such as driving means or backup means.

As a battery for satisfying such a demand, has been developed and put into practical use a nonaqueous electrolyte battery, what is called a lithium battery which includes a cathode and an anode having active materials capable of reversibly inserting and extracting lithium ions and a nonaqueous electrolyte and has such advantages as a high output and high energy density.

Especially, the lithium battery including a polymer electrolyte as the nonaqueous electrolyte has characteristics that the battery is excellent in its leak resistance and high in its safety. Further, since the lithium battery including the polymer electrolyte is light in its weight and may be thinned in this thickness, the configuration of the battery can be designed so as to meet the forms or size of various kinds of electronic devices. Therefore, this lithium battery has a feature that has not been seen in the conventional batteries.

For example, when a thin and flat plate type polymer electrolyte battery is produced, a battery element may be formed by providing a polymer electrolyte between a thin sheet type cathode and a thin sheet type anode and the battery element may be covered with a laminate film having an aluminum foil as a core material.

Nowadays, in order to make various types of electronic devices more compact, it has been necessary to efficiently employ the inner spaces of the electronic devices, and it has been especially demanded to use the inner spaces having curved surfaces as spaces for accommodating the batteries serving as the power sources of the electronic device.

Figure 1:
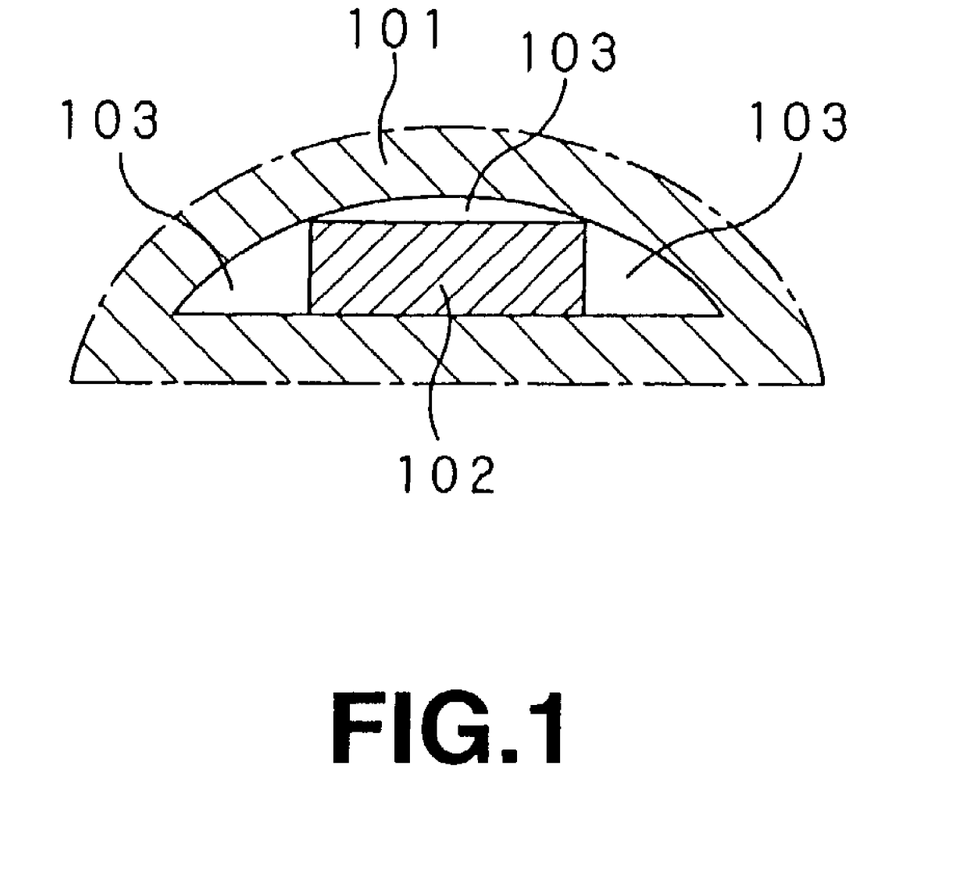
FIG. 1 is a schematic sectional view showing an electronic device to which a flat plate type polymer electrolyte battery is attached.

However, for instance, as shown in FIG. 1, when a flat plate type polymer electrolyte battery 102 is attached to an inner space having a curved surface in a portable electronic device 101 such as a portable telephone or a PDA, useless spaces 103 are inconveniently generated between the casing of the electronic device 101 and the flat plate type polymer electrolyte battery 102 so that the inner space of the electronic device 101 cannot be efficiently used.

Thus, as a method for efficiently using these spaces 103, the flat plate type polymer electrolyte battery 102 may be curved so as to meet the form of the inner space of the electronic device 101.

However, since the flat plate type polymer electrolyte battery 102 has a flat plate type battery element including a thin sheet type cathode and a thin sheet type anode and a polymer electrolyte interposed therebetween, even when the flat plate type polymer electrolyte battery 102 is curved, a desired curved form cannot be held for a long time. Further, an electrode active material layer may be cracked or further may be separated from a current collector due to an external force when the flat plate type battery element is bent. Therefore, when the flat plate type polymer electrolyte battery 102 is bent, battery characteristics are disadvantageously extremely deteriorated.

For example, in Japanese Patent Application Laid-Open No. hei 11-307130, is disclosed a method for bending a flat plate type battery element by applying a thermocompression bonding process to the battery element (refer it to simply as a flat plate type battery element, hereinafter) having a cathode and an anode laminated through a polymer electrolyte using two rolls respectively having different diameter. According to this method, although the curved configuration of the battery element is maintained, a shearing stress by the rolls with different diameter is exerted on a part between an active material layer and a current collector, so that the resistance of a cell is undesirably increased, a short-circuit is apt to be generated at the end of a stacked electrode, and accordingly, a stable battery performance cannot be inconveniently obtained. Further, not only the curvature of a desired curved configuration can be extremely hardly obtained, but also the thickness of a cell is inconveniently greatly regulated.

SUMMARY OF THE INVENTION

The present invention is proposed by taking these conventional circumstances into consideration and it is an object of the present invention to provide a polymer electrolyte battery in which a possibility of short-circuit is low in the end part of an electrode and battery characteristics are good even when the electrode has, for instance, a curved form or a semicircular curved surface so as to be adapted to the form of each of the inner spaces of various kinds of electronic devices and a method for manufacturing it.

For achieving the above-described object, a polymer electrolyte battery according to the present invention includes a battery element having a cathode and an anode coiled through a polymer electrolyte, wherein a section of the battery element perpendicular to the coiling axis has a curved form.

The polymer electrolyte battery according to the present invention constructed as mentioned above includes a battery element having a cathode and an anode coiled through a polymer electrolyte whose section perpendicular to the coiling axis of the battery element has a curved form. Therefore, when the polymer electrolyte battery of the present invention is compared with a polymer electrolyte battery having a flat plate type battery element curved, the former battery has an extremely low possibility of short-circuit at the end of an electrode and excellent battery characteristics. Further, in the polymer electrolyte battery according to the present invention, at least a part of the curved form may have a flat part.

Further, a polymer electrolyte battery includes a battery element having a cathode and an anode coiled through a polymer electrolyte, wherein a section of the battery element perpendicular to the coiling axis has a semicircular form.

The polymer electrolyte battery according to the present invention configured as mentioned above includes a battery element having a cathode and an anode coiled through a polymer electrolyte whose section perpendicular to the coiling axis of the battery element has a semicircular form. Therefore, when the polymer electrolyte battery of the present invention is compared with a polymer electrolyte battery having a flat plate type battery element curved, the former battery has an extremely low possibility of short-circuit at the end of an electrode and excellent battery characteristics. Further, in the polymer electrolyte battery according to the present invention, at least a part of a substantially circular arc part of the semicircular form may have a flat part.

A method for manufacturing a polymer electrolyte battery according to the present invention comprises a battery element forming step of forming a battery element having a cathode and an anode coiled through a polymer electrolyte; and a thermocompression bonding and forming step of applying a thermocompression bonding process to the battery element between a recessed heater block having a curved recessed surface and a protruding heater block having a curved protruding surface so that a section of the battery element perpendicular to the coiling axis has a curved form.

In the method for manufacturing a polymer electrolyte battery according to the present invention constructed as mentioned above, the battery element having the cathode and the anode coiled through the polymer electrolyte undergoes a thermocompression bonding process between the recessed heater block and the protruding heater block so as to be curved. Therefore, according to the method for manufacturing the polymer electrolyte battery of the present invention, can be manufactured the polymer electrolyte battery in which, while a manufacturing process is simple, an electrode interface adhesion property is improved, the curved form can be maintained for a long time, a possibility of short-circuit at the end of the electrode can be reduced and battery characteristics are desirably maintained.

Further, in a method for manufacturing a polymer electrolyte battery according to the present invention, the battery element may undergo a thermocompression bonding process between the recessed heater block having a flat surface part at least in a part of the curved part and the protruding heater block having a flat surface part at least in a part of the curved part so that a section of the battery element perpendicular to the coiling axis has a curved form having a flat part at least in a part thereof.

Further, a method for manufacturing a polymer electrolyte battery according to the present invention comprises: a battery element forming step of forming a battery element having a cathode and an anode coiled through a polymer electrolyte; and a thermocompression bonding and forming step of applying a thermocompression bonding process to the battery element between a recessed heater block having a curved recessed surface and a flat surface type heater block having a flat surface so that a section of the battery element perpendicular to the coiling axis has a substantially semicircular form.

In the method for manufacturing a polymer electrolyte battery according to the present invention constructed as mentioned above, the battery element having the cathode and the anode coiled through the polymer electrolyte undergoes a thermocompression bonding process between the recessed heater block and the flat surface type heater block so as to have a substantially semicircular form. Therefore, according to the method for manufacturing the polymer electrolyte battery of the present invention, can be manufactured the polymer electrolyte battery in which, while a manufacturing process is simple, an electrode interface adhesion property is improved, the substantially semicircular form can be maintained for a long time, a possibility of short-circuit at the end of the electrode can be reduced and battery characteristics are desirably maintained.

Still further, in a method for manufacturing a polymer electrolyte battery according to the present invention, the battery element may undergo a thermocompression bonding process between the recessed heater block having a flat surface part at least in a part of the curved part and the flat surface type heater block having the flat surface so that the section of the battery element perpendicular to the coiling axis has a substantially semicircular form and a flat part is formed at least in a part of a substantially circular arc part.

Still other objects, characteristics or advantages of the present invention will become more apparent from the detailed description in accordance with embodiments of the present invention which will be described below and accompanying drawings.

DETAILED DESCRIPTION OF THE PRESENTLY PREFERRED EMBODIMENTS

Now, embodiments of a polymer electrolyte battery according to the present invention will be described in detail by referring to the drawings.

Figure 2:
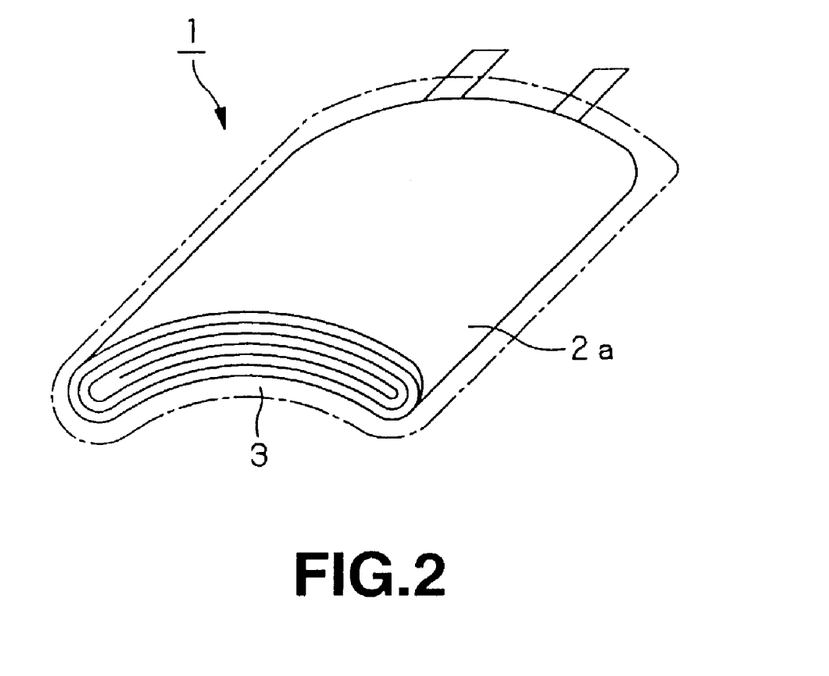
FIG. 2 is a perspective view of a polymer electrolyte battery including a battery element in which a section perpendicular to a coiling axis has a curved form.

In a polymer electrolyte battery 1 to which the present invention is applied, a battery element 2a in which a section perpendicular to a coiling axis has a curved form is covered with a laminate film 3 made of an insulating material or the like and sealed under reduced pressure as shown in FIG. 2.

Figure 3:
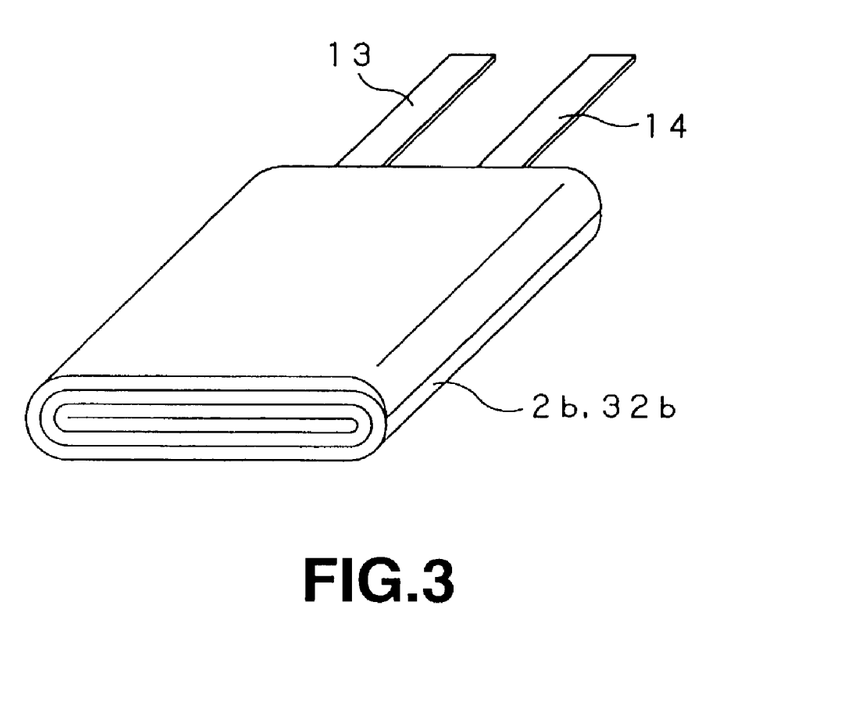
FIG. 3 is a schematic view showing a flat type battery element.

The battery element 2a is formed by forming a flat type battery element 2b shown in FIG. 3 and including a cathode and an anode coiled longitudinally through a polymer electrolyte layer in accordance with a forming method as described below so that a section perpendicular to a coiling axis has a curved form.

Figure 4:
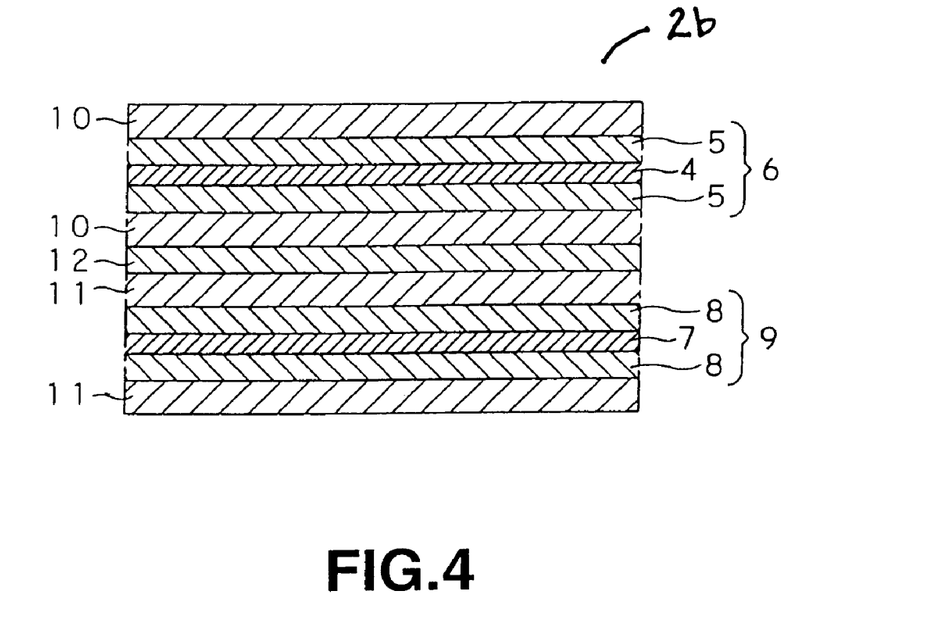
FIG. 4 is a sectional view of main parts showing the flat type battery element.

Specifically shown in FIG. 4, the battery element 2b includes a cathode 6 having cathode active material layers 5 respectively formed on both the main surfaces of a cathode current collector 4, an anode 9 having anode active material layers 8 respectively formed on both the main surfaces of an anode current collector 7 and polymer electrolyte layers 10 formed on the cathode active material layers 5 and polymer electrolyte layers 11 formed on the anode active material layers 8. Then, the cathode 6 having the polymer electrolyte layers 10 and the anode 9 including the polymer electrolyte layers 11 are laminated through a separator 12, and then, the laminated body is coiled in the longitudinal direction to form the battery element 2b. Further, as shown in FIG. 3, a cathode terminal 13 using aluminum is formed at one end of the cathode current collector 4 and an anode terminal 14 using copper or nickel is formed at one end of the anode current collector 7, respectively.

The battery element 2b is formed as the battery element 2a with its section perpendicular to the coiling axis having a curved form as shown in FIG. 2 and then accommodated in the above-described laminate film 3 while the cathode terminal 13 and the anode terminal 14 are guided outside.

As the cathode current collector 4, may be used aluminum, titanium or alloys of them, etc. The cathode current collector 4 may be formed in a foil shape, a lath form, a punching metal, a net or the like. The thickness of the cathode current collector 4 is preferably 20 m or lower.

The cathode active material layers 5 are formed by applying on both the main surfaces of the cathode current collector 4 cathode composite mixture slurry obtained by dispersing a cathode composite mixture including a cathode active material, a conductive material and a binding agent in a solvent.

As the cathode active material, any of conventionally known cathode active materials may be employed in such polymer electrolyte batteries. For instance, composite oxides with lithium and transition metals may be used. More specifically, there may be employed materials including only one kind of transition metal such as $LiCoO_2$, $LiNiO_2$, $LiMn_2O_4$, $LiAlO_2$, etc. or materials including two or more kinds of transition metals such as $LiNi_{0.5}Co_{0.5}O_2$, $LiNi_{0.8}Co_{0.2}O_2$, etc.

As the conductive agent, for instance, carbon materials may be used. Further, as the binding agent, for instance, polyvinylidene fluoride can be used. As the solvent, for instance, N-methyl pyrrolidone my be used.

As the anode current collector 7, for instance, copper may be used. The anode current collector 7 may be configured to be a foil form, a lath form, a punching metal, a net, etc.

The anode active material layers 8 are formed by applying on both the main surfaces of the anode current collector 7 anode composite mixture slurry obtained by dispersing an anode composite mixture including an anode active material and a binding agent in a solvent.

As the anode active material, any of conventionally known anode active materials may be employed in such polymer electrolyte batteries. For instance, lithium metals, lithium alloys or materials capable of inserting/extracting lithium may be used.

As the materials capable of inserting/extracting lithium, for instance, carbon materials such as graphite, non-graphitizable carbons, graphitizable carbons, etc. may be employed. More specifically, there may be utilized, pyrocarbons or coke (pitch coke, needle coke, petroleum coke), graphite, vitreous carbons, organic polymer compound sintered bodies (obtained by sintering phenol resins or furan resins at suitable temperature and carbonizing the sintered products), carbon fibers and activated carbons, etc. Further, as the materials capable of inserting/extracting lithium, there may be used polymers such as polyacetylene or polypyrrole, oxides such as $SnO_2$, etc.

To the anode composite mixture, a conductive material may be added as required. As the conductive material, for instance, carbon materials or the like may be used. Further, as the binding agent, for instance, polyvinylidene fluoride may be used. As the solvent, for instance, N-methyl pyrrolidone may be employed.

As the polymer electrolyte forming the polymer electrolyte layers 10 and 11, any kind of polymer electrolytes used in such nonaqueous electrolyte batteries may be used. Especially, a solid polymer electrolyte having a heat sealing property or a thermosetting property and high in its electrochemical stability or a gel electrolyte obtained by adding a plasticizer to the solid polymer electrolyte can be preferably employed.

The above-described gel electrolyte includes a nonaqueous solvent, electrolyte salt and a matrix polymer.

As the nonaqueous solvent, there may be employed carbonates such as ethylene carbonate, propylene carbonate, γ-butyrolactone, dimethyl carbonate, diethyl carbonate, ethyl methyl carbonate, dipropyl carbonate, ethyl propyl carbonate, vinylene carbonate or solvents obtained by replacing hydrogens of these carbonates by halogens, etc. These nonaqueous solvents may be independently used or two or more kinds of them may be mixed together and the mixture may be used.

As the electrolyte salt, there may be used, for instance, $LiPF_6$, $LiClO_4$, $LiCF_3SO_3$, $LiAsF_6$, $LiBF_4$, $LiN(CF_3SO_3)_2$, $C_4F_9SO_3Li$, etc. One kind of these electrolyte salts may be independently used or two or more kinds of them may be mixed and the mixture may be used.

As the matrix polymer, polymers which can suitably hold nonaqueous electrolyte solution obtained by dissolving the electrolyte salt in the nonaqueous solvent to be gel are employed. As the specific matrix polymers, may be used polymers including polyvinylidene fluoride, polyethylene oxide, polypropylene oxide, polyacrylonitrile, polymethacrylonitrile as a repeated unit, however, the matrix polymer is not limited thereto. As such a thermoplastic matrix polymer, one kind of polymer may be independently used or two or more kinds of polymers may be mixed together and the mixture may be used.

Further, as the matrix polymer, may be utilized polymers in which monomers having one or more reactive unsaturated groups in molecules are bridged in nonaqueous electrolyte solution. As the monomer having the reactive unsaturated groups, can be used, for instance, acrylic acid, methyl acrylate, ethoxyethyl acrylate, methoxyethyl acrylate, polyethylene glycol monoacrylate, ethoxyethyl methacrylate, methoxyethyl methacrylate, glycidyl acrylate, acryl acrylate, acrylonitrile, diethylene glycol diacrylate, triethylene glycol diacrylate, polyethylene glycol triacrylate, diethylene glycol dimethacrylate, etc. Monomers desired in view of reactivity or polarity may be independently used or combined together and the combination thereof may be used. However, the monomers are not limited thereto. As methods for polymerizing these monomers, for instance, means by heat, ultraviolet rays, electron beam or the like may be utilized. A polymerization method by the heat among these methods in which an electrode layer/a gel electrolyte layer can be easily formed integrally is most effective.

As the separator 12, porous polyolefine or non-woven fabric or the like can be employed. Specially, when the diaphragm property of the polymer electrolytes 10 and 11 is low, the separator 12 is preferably inserted in a suitable manner.

The polymer electrolyte battery 1 constructed as described above has the battery element 2a including the cathode 6 and the anode 9 coiled through the polymer electrolyte layers 10 and 11 in which a section perpendicular to a coiling axis has a curved form. Thus, when the polymer electrolyte battery 1 is compared with a conventional polymer electrolyte battery having a flat plate type battery element bent, the electrolyte battery 1 is extremely low in its possibility of short-circuit at the end part of an electrode and has good battery characteristics.

Figure 5:
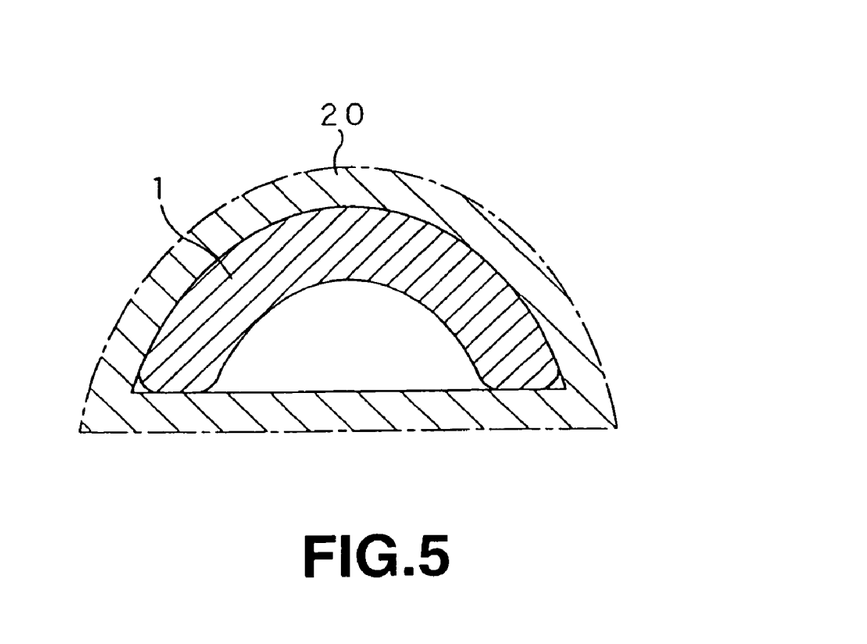
FIG. 5 is a schematic sectional view showing an electronic device to which a polymer electrolyte battery including a battery element whose section perpendicular to a coiling axis has a curved form is attached.

Therefore, according to the polymer electrolyte battery 1 to which the present invention is applied, since the form of the polymer electrolyte battery 1 can be very easily adapted to the form of the inner space of an electronic device 20 having a curved surface, the space accommodation efficiency of the polymer electrolyte battery 1 can be improved, as shown in FIG. 5. As a result, a useless space which has been hitherto generated between the casing of the electronic device and the flat plate type polymer electrolyte battery can be filled with the generating element, so that the polymer electrolyte battery can contribute to the variety of the external form or the compact size of the electronic device 20.

Figure 6:
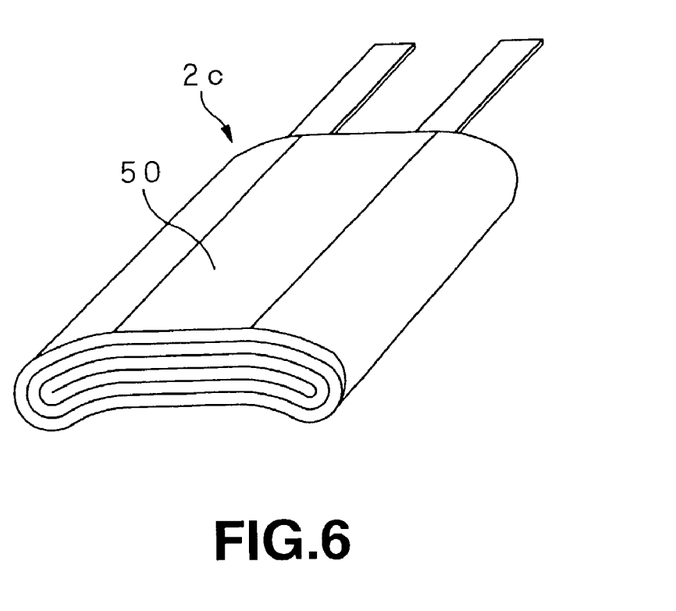
FIG. 6 is a perspective view showing a battery element in which a section perpendicular to a coiling axis has a curved form having a flat part at least in a part thereof.

In the above-mentioned polymer electrolyte battery 1, although an example in which the section of the battery element 2b perpendicular to the coiling axis has a curved form is described, the present invention is not limited thereto. For instance, as shown in FIG. 6, the section of a battery element 2c perpendicular to a coiling axis may have a curved form having a flat part 50 at least in a part thereof.

Now, a method for manufacturing the above-described polymer electrolyte battery 1 will be described. When the polymer electrolyte battery 1 is manufactured, a battery element forming step for forming the flat type battery element 2b is initially carried out. Then, a thermocompression bonding and forming step for applying a thermocompression bonding process to the battery element 2b to form the battery element 2a whose section perpendicular to the coiling axis has a curved form. Subsequently, a sealing step for covering the battery element 2a with the laminate film 3 and sealing under reduced pressure is carried out.

In the battery element forming step, the cathode 6 and the anode 9 are coiled through the polymer electrolyte layers 10 and 11 to form the flat type battery element 2b.

In order to manufacture the cathode 6, the cathode composite mixture formed by uniformly mixing the cathode active material, the conductive material and the binding agent together is dispersed in the solvent to prepare cathode composite mixture slurry. Then, this cathode composite mixture slurry is uniformly applied to both the surfaces of the cathode current collector 4 by, for example, a doctor blade method. Then, a film in a wet state is dried at high temperature to blow off the solvent and form the cathode active material layers 5.

Then, the cathode terminal 13 is connected to one end of the cathode current collector 4 by a spot welding method or an ultrasonic welding method. The cathode terminal 13 preferably protrudes in the same direction as that of the anode terminal 14. However, in case a short-circuit is not generated and a battery performance has no problem, the cathode terminal 13 may protrude in any direction. Further, when a position to which the cathode terminal 13 is connected has an electric connection, a place to which the cathode terminal 13 is attached and a method for attaching the cathode terminal 13 are not limited to a prescribed place or a prescribed method.

In order to manufacture the anode 9, firstly, the anode composite mixture obtained by uniformly mixing the anode active material with the binding agent is dispersed in the solvent to prepare the anode composite mixture slurry. The conductive material may be added to the anode composite mixture as required. Then, the anode composite mixture slurry is uniformly applied to both the surfaces of the anode current collector 7 by, for instance, a doctor blade method or the like. Subsequently, a film in a wet state is dried at high temperature to blow off the solvent and form the anode active material layers 8.

After that, the anode terminal 14 is connected to one end of the anode current collector 7 by a spot welding method or a ultrasonic welding method. The anode terminal 14 is preferably extended in the same direction as that of the cathode terminal 13. However, in case a short-circuit is not generated and a battery performance has not trouble, the anode terminal 14 may be extended in any direction. Further, when a position to which the anode terminal 14 is connected has an electric connection, any place to which the anode terminal 14 is attached and any method for attaching the anode terminal 14 may be employed without limitation.

Then, polymer electrolyte solution including, for instance, solvent such as dimethyl carbonate, a plasticizer and matrix polymer is applied to the cathode active material layers 5 and the anode active material layer 8, and then, dimethyl carbonate is vaporized and removed so that the gel polymer electrolyte layers 10 and 11 are formed.

Subsequently, the band shape cathode 6 on which the polymer electrolyte layers 10 are formed and the band shape anode 9 on which the polymer electrolyte layers 11 are formed are longitudinally coiled through the separator 12 to obtain the flat type battery element 2b.

In the thermocompression bonding and forming step, the thermocompression bonding process is applied to the battery element 2b between a recessed heater block having a curved recessed surface and a protruding hater block having a curved protruding surface so that the section of the battery element 2b perpendicular to the coiling axis has a curved form.

Figure 7:
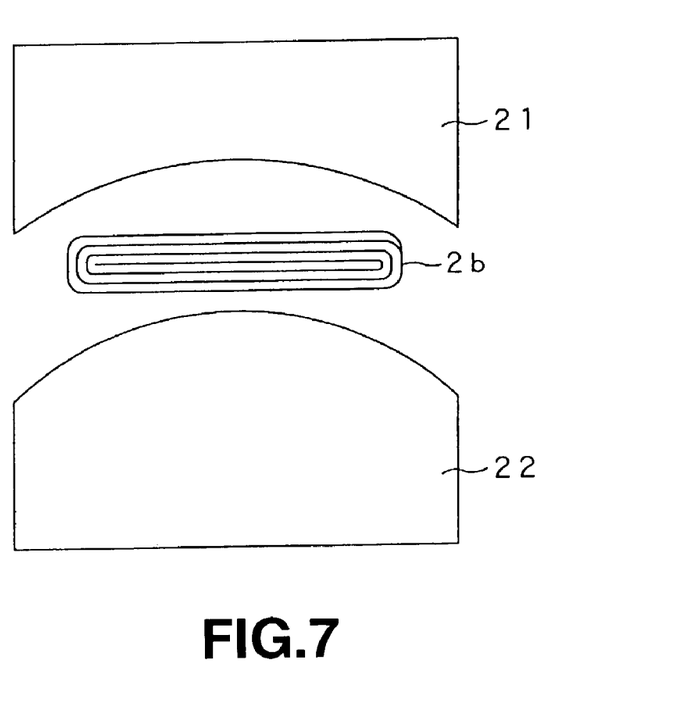
FIG. 7 is a schematic view showing a state that a flat type battery element is inserted into a part between a recessed heater block and a protruding heater block.
Figure 8:
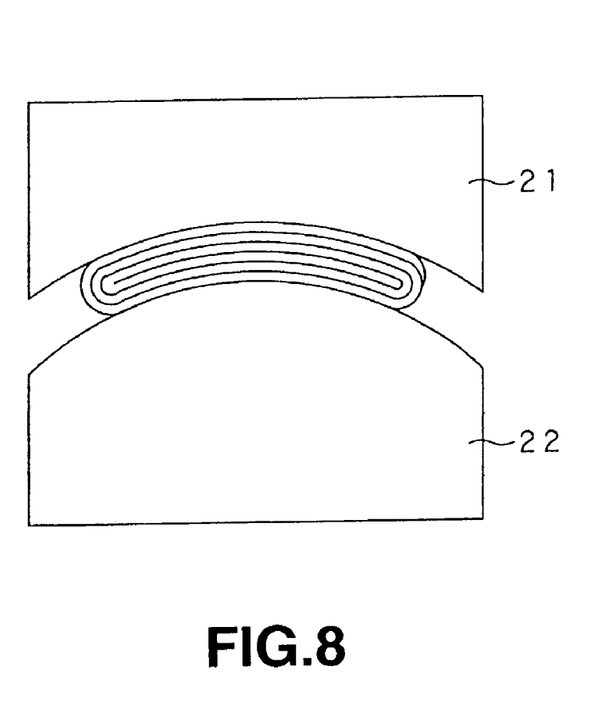
FIG. 8 is a schematic view showing a state that the recessed heater block and the protruding heater block are clamped.

When the thermocompression bonding process is applied to the battery element 2b, the flat type battery element 2b is firstly inserted between the recessed heater block 21 and the protruding heater block 22 as shown in FIG. 7. Then, as shown in FIG. 8, the recessed heater block 21 and the protruding heater block 22 are clamped to perform a thermocompression bonding process by properly adjusting the temperature and pressure of the heater blocks 21 and 22.

Figure 9:
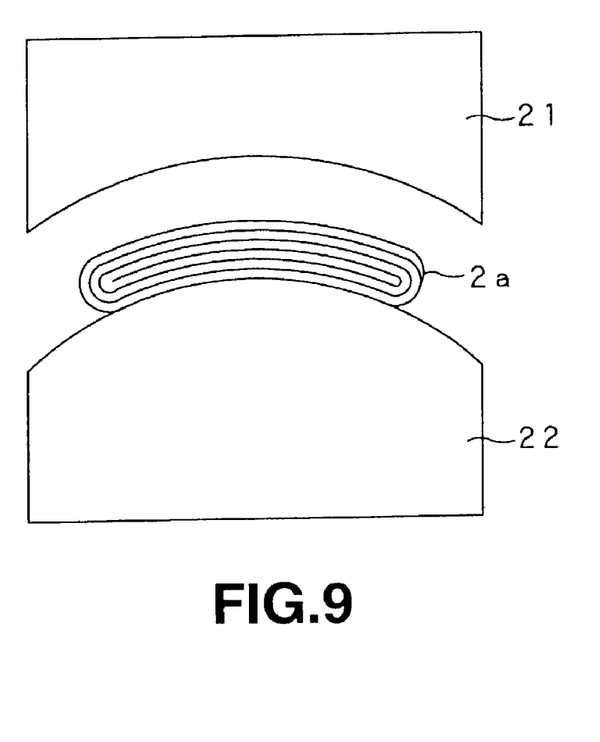
FIG. 9 is a schematic view showing a state that the recessed heater block and the protruding heater block are opened.

Then, as shown in FIG. 9, the recessed heater block 21 and the protruding heater block 22 are opened so that the battery element 2a whose section perpendicular to the coiling axis has a curved form is released therefrom.

The flat type battery element 2b is subjected to a thermocompression bonding process to be formed by using the recessed heater block 21 and the protruding heater block 22 as described above, so that the battery element 2a in which the section perpendicular to the coiling axis has the curved form is obtained.

In the thermocompression bonding and forming step, since the entire body of the battery element 2b undergoes the thermocompression bonding process by using the recessed heater block 21 and the protruding heater block 22 so that the section of the battery element perpendicular to the coiling axis has the curved form, the battery element 2a having an excellent electrode interface adhesion property, provided with a good electrode/electrolyte interface for the polymer electrolyte battery 1 and capable of holding the curved form for a long time can be obtained.

In the sealing step, the battery element 2a in which the section of the battery element perpendicular to the coiling axis has the curved form is held by the laminate films 3 and the outer peripheral edge parts of the laminate films 3 are heat-sealed under reduced pressure.

Thus, the polymer electrolyte battery 1 in which the battery element 2a is sealed in the laminate films 3 is obtained.

According to the method for manufacturing the polymer electrolyte battery 1 having the above-described steps, the flat type battery element 2b formed by coiling the cathode 6 and the anode 9 through the polymer electrolyte layers 10 and 11 is subjected to the thermocompression bonding process by using the recessed heater block 21 and the protruding heater block 22 so that the section of the battery element 2b perpendicular to the coiling axis thereof has the curved form.

Therefore, according to the method for manufacturing the polymer electrolyte battery 1, can be manufactured the polymer electrolyte battery 1 in which an electrode interface adhesion property is more improved, the curved form in section perpendicular to the coiling axis can be held for a longer time, a possibility of short-circuit in the end part of the electrode is more reduced and the battery characteristics are more desirably maintained, while manufacturing processes are simple, than a conventional polymer electrolyte battery having a flat plate type battery element curved produced by a conventional battery producing method.

In the above-described method for manufacturing the polymer electrolyte battery 1, although a case in which the battery element 2a formed in such a way that the section of the battery element perpendicular to the coiling axis has the curved form is covered with the laminate film 3 is mentioned, the present invention is not limited thereto. After the flat type battery element 2b is covered and sealed with the laminate film 3, the obtained battery element may be inserted into a part between the recessed heater block 21 and the protruding heater block 22, and then, the battery element may be subjected to the thermocompression bonding process in a similar method to that described above.

Figure 10:
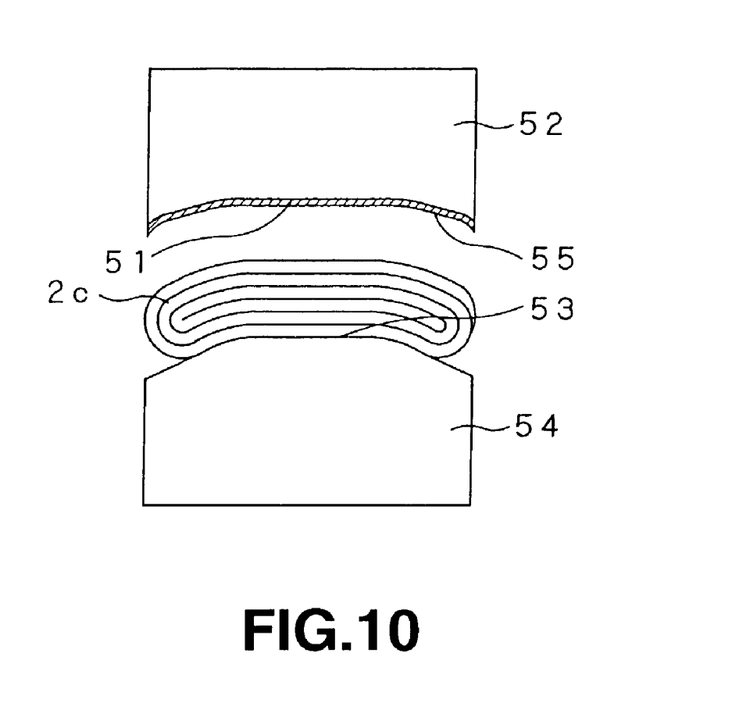
FIG. 10 is a schematic view showing a state that a flat type battery element is inserted into a part between a recessed heater block having a flat surface part in the central part of a curved surface part and a protruding heater block having a flat surface part in the central part of a curved surface part.

Further, in the above-described method for manufacturing the polymer electrolyte battery 1, although a case in which the battery element 2b is subjected to the thermocompression bonding process between the recessed heater block having the curved recessed surface and the protruding heater block having the curved protruding surface so that the section of the battery element 2b perpendicular to the coiling axis thereof has the curved form is mentioned, the present invention is not limited thereto. For instance, as shown in FIG. 10, the above-described battery element may be subjected to the thermocompression bonding process between a recessed heater block 52 having a flat surface part 51 at least in a part of a curved part and a protruding heater block 54 having a flat surface part 53 at least in a part of a curved part. A battery element 2c obtained in such a manner has a curved form so that the section of the battery element 2c perpendicular to a coiling axis has a flat part 50 at least in a part thereof.

A silicon rubber sheet 55 is preferably arranged on at least one of the surfaces of the recessed heater block 52 and the protruding heater block 54 (in this case, the recessed heater block 52) opposed to the battery element 2c. The silicon rubber sheet 55 is arranged so that heat and pressure can be uniformly applied to the battery element 2c.

Now, another polymer electrolyte battery to which the present invention is applied will be described below.

Figure 11:
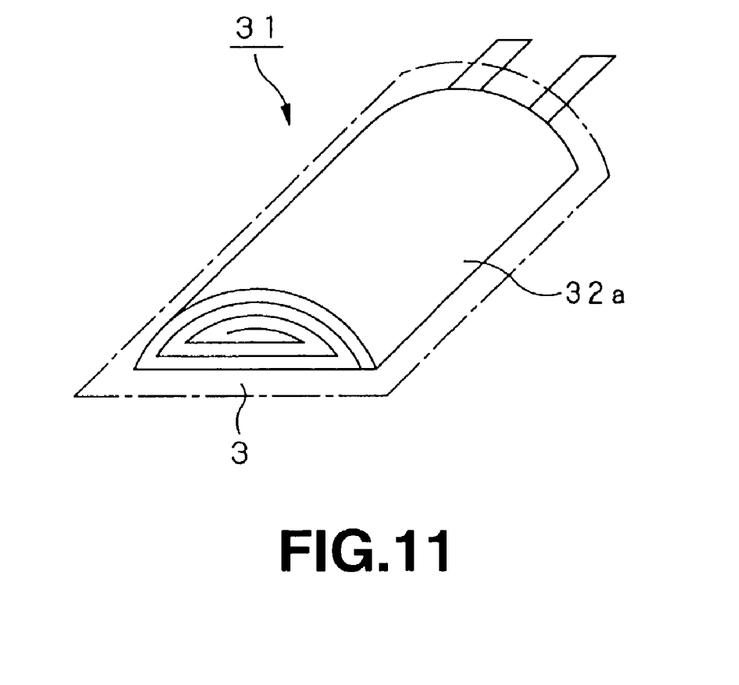
FIG. 11 is a perspective view of a polymer electrolyte battery having a battery element in which a section perpendicular to a coiling axis has a substantially semicircular form.

In a polymer electrolyte battery 31 according to another embodiment to which the present invention is applied, a battery element 32a in which a section of the battery element perpendicular to a coiling axis has a substantially semicircular form is covered with a laminate film 3 made of an insulating material and sealed under reduced pressure.

The polymer electrolyte battery 31 has the same construction as that of the above-described polymer electrolyte battery 1 except that the battery 31 has the battery element 32a in which the section perpendicular to the coiling axis has the substantially semicircular form. Therefore, the same members as those of the above-described polymer electrolyte battery 1 are designated by the same reference numerals and the explanation thereof is omitted.

Since the polymer electrolyte battery 31 includes the battery element 32a having a cathode 6 and an anode 9 coiled through polymer electrolyte layers 10 and 11 so that the section of the battery element perpendicular to the coiling axis has the substantially semicircular form, the polymer electrolyte battery 31 is extremely low in its possibility of short-circuit at the end part of an electrode and good in its battery characteristics, as compared with an existing polymer electrolyte battery having a flat plate type battery element bent.

Figure 12:
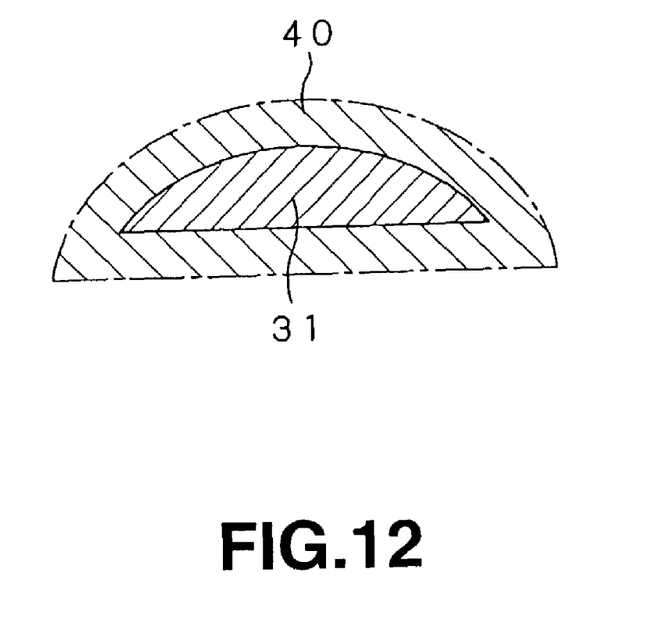
FIG. 12 is a schematic sectional view showing an electronic device to which a polymer electrolyte battery having a battery element whose section perpendicular to a coiling axis has a substantially semicircular form is attached.

Therefore, according to the polymer electrolyte batter 31 to which the present invention is applied, since the form of the polymer electrolyte battery 31 can be outstandingly easily adapted to the form of the inner space of an electronic device 40 having a curved surface, as shown in FIG. 12, so that the space accommodation efficiency of the polymer electrolyte battery 31 can be improved. As a result, a useless space which has been hitherto generated between the casing of the electronic device and the flat plate type polymer electrolyte battery can be filled with the generating element, so that the polymer electrolyte battery can contribute to the diversity of the external form and the compact size of the electronic device 40.

Figure 13:
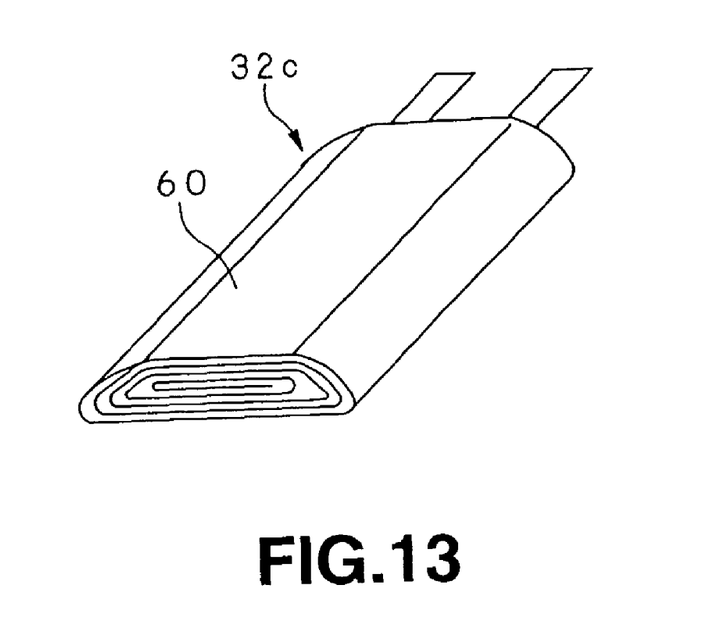
FIG. 13 is a perspective view of a battery element in which a section perpendicular to a coiling axis has a flat part at least in a part of a substantially circular arc part.

In the above-described polymer electrolyte battery 31, although a case in which the section of the battery element 32a perpendicular to the coiling axis has the substantially semicircular form is mentioned, the present invention is not limited thereto. For instance, as shown in FIG. 13, the polymer electrolyte battery may be formed so that the section of the battery element 32c perpendicular to a coiling axis has a substantially semicircular form including a flat part 60 at least in a part of a substantially circular arc part.

Now, a method for manufacturing the above-described polymer electrolyte battery 31 will be described. When the polymer electrolyte battery 31 is manufactured, a battery element forming step for forming the flat type battery element 32b is initially carried out. Then, a thermocompression bonding and forming step for applying a thermocompression bonding process to the battery element 32b to form the battery element 32a whose section perpendicular to the coiling axis has a substantially semicircular form. Subsequently, a sealing step for covering the battery element 32a with the laminate film 3 and sealing it under reduced pressure is carried out.

Since the battery element forming step in the method for manufacturing the polymer electrolyte battery 31 is the same as the battery element forming step in the method for manufacturing the polymer battery 1, an explanation thereof is omitted.

In the thermocompression bonding and forming step, the thermocompression bonding process is applied to the battery element 32b between a recessed heater block having a curved recessed surface and a flat surface type hater block having a flat surface so that the section of the battery element 32b perpendicular to the coiling axis has a substantially semicircular form.

Figure 14:
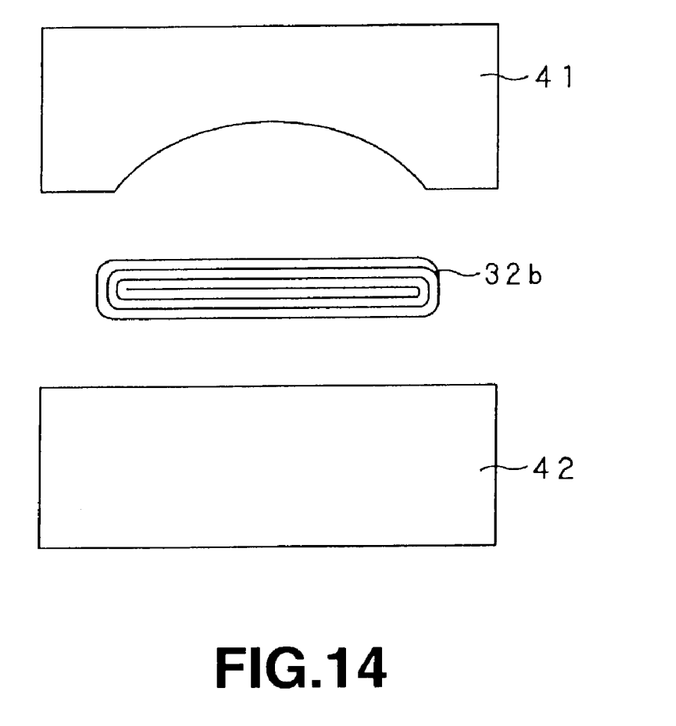
FIG. 14 is a schematic view showing a state that a flat type battery element is inserted into a part between a recessed heater block and a flat surface type heater block.
Figure 15:
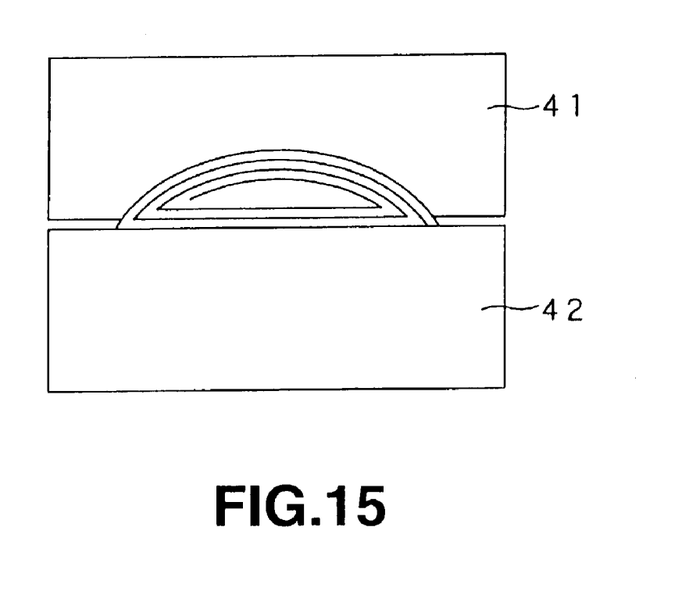
FIG. 15 is a schematic view showing a state that the recessed heater block and the flat surface type heater block are clamped.

When the thermocompression bonding process is applied to the battery element 32b, the flat type battery element 32b is firstly inserted between the recessed heater block 41 and the flat surface type heater block 42 as shown in FIG. 14. Then, as shown in FIG. 15, the recessed heater block 41 and the flat surface type heater block 42 are clamped to perform a thermocompression bonding process by properly adjusting the temperature and pressure of the heater blocks 41 and 42.

Figure 16:
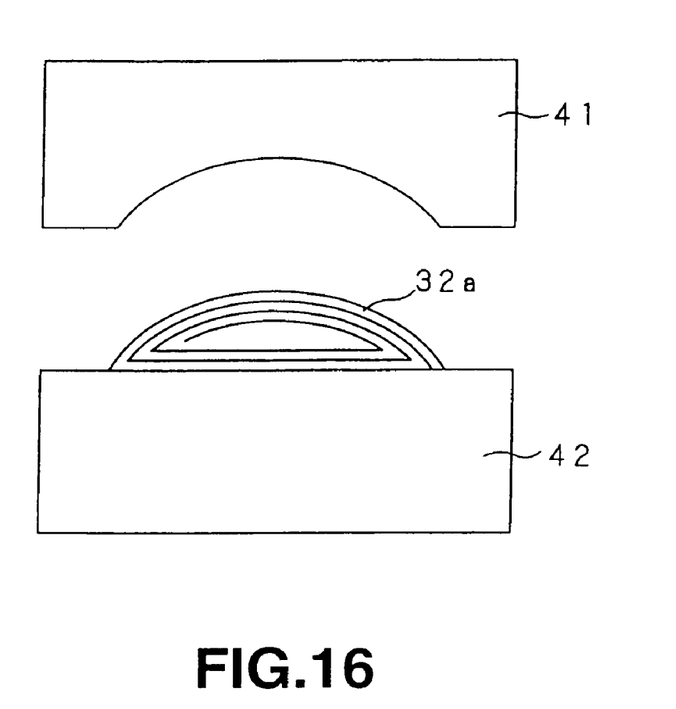
FIG. 16 is a schematic view showing a state that the recessed heater block and the flat surface type heater block are opened.

Then, as shown in FIG. 16, the recessed heater block 41 and the flat surface type heater block 42 are opened so that the battery element 32a whose section perpendicular to the coiling axis has a substantially semicircular form is released therefrom.

The flat type battery element 32b is subjected to a thermocompression bonding process to be formed by using the recessed heater block 41 and the flat surface type heater block 42 as described above, so that the battery element 32a in which the section perpendicular to the coiling axis has the curved form is obtained.

In the thermocompression bonding process and forming step, since the entire body of the battery element 32b undergoes the thermocompression bonding process by using the recessed heater block 41 and the flat surface type heater block 42 so that the section of the battery element perpendicular to the coiling axis has the substantially semicircular form, the battery element 32a having an excellent electrode interface adhesion property, provided with a good electrode/electrolyte interface for the polymer electrolyte battery 31 and capable of holding the substantially semicircular form for a long time can be obtained.

In the sealing step, the battery element 2a in which the section of the battery element perpendicular to the coiling axis has the substantially semicircular form is held by the laminate films 3 and the outer peripheral edge parts of the laminate films 3 are heat-sealed under reduced pressure.

Thus, the polymer electrolyte battery 1 in which the battery element 2a is sealed in the laminate films 3 is obtained.

According to the method for manufacturing the polymer electrolyte battery 31 having the above-described steps, the flat type battery element 32b formed by coiling the cathode 6 and the anode 9 through the polymer electrolyte layers 10 and 11 is subjected to the thermocompression bonding process by using the recessed heater block 41 and the flat surface type heater block 42 so that the section of the battery element 32b perpendicular to the coiling axis thereof has the substantially semicircular form.

Therefore, according to the method for manufacturing the polymer electrolyte battery 31, can be manufactured the polymer electrolyte battery 31 in which an electrode interface adhesion property is more improved, the substantially semicircular form in section perpendicular to the coiling axis can be held for a longer time, a possibility of short-circuit in the end part of the electrode is more reduced and the battery characteristics are more desirably maintained, while manufacturing processes are simple, than a conventional polymer electrolyte battery having a plate type battery element curved produced by a conventional battery producing method.

In the above-described method for manufacturing the polymer electrolyte battery 31, although a case in which the battery element 32a formed in such a way that the section of the battery element perpendicular to the coiling axis has the substantially semicircular form is covered with the laminate film 3 is mentioned, the present invention is not limited thereto. After the flat type battery element 32b is covered and sealed with the laminate film 3, the obtained battery element may be inserted into a part between the recessed heater block 41 and the flat surface type heater block 42, and then, the battery element may be subjected to the thermocompression bonding process in a similar method to that described above.

Figure 17:
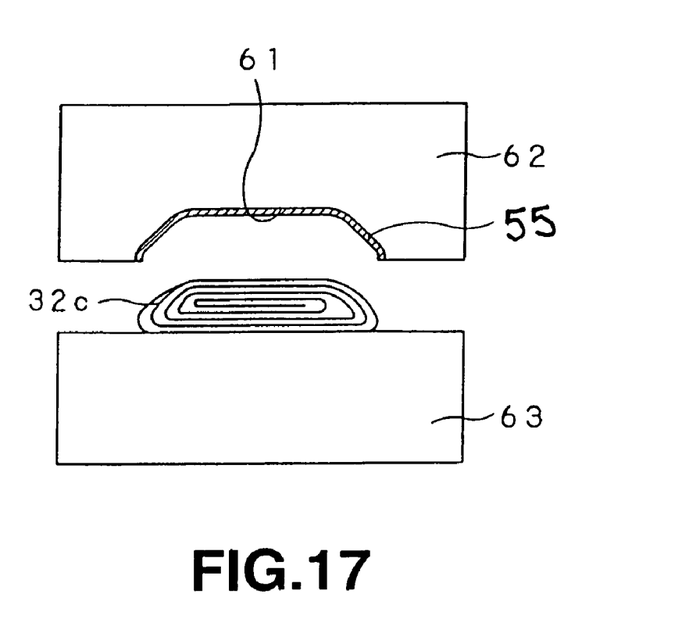
FIG. 17 is a schematic view showing a state that a flat type battery element is inserted into a part between a recessed heater block having a flat surface part in the central part of a curved surface part and a flat surface type heater block.

Further, in the above-described method for manufacturing the polymer electrolyte battery 31, although a case in which the battery element 32b is subjected to the thermocompression bonding process between the recessed heater block having the curved recessed surface and the flat surface type heater block so that the section of the battery element 32a perpendicular to the coiling axis thereof has the semicircular form is mentioned, the present invention is not limited thereto. For instance, as shown in FIG. 17, the above-described battery element may be subjected to the thermocompression bonding process between a recessed heater block 62 having a flat surface part 61 at least in a part of a curved part and a flat surface type heater block 63. A battery element 32c obtained has a form in which the section of the battery element 32c perpendicular to a coiling axis has a substantially semicircular form including a flat part 60 at least in a part of a substantially circular arc part, as shown in FIG. 13.

A silicon rubber sheet 55 is preferably arranged on either one of the surfaces of the recessed heater block 62 and the flat surface type heater block 63 (in this case, the recessed heater block 62) opposed to the battery element 32c. The silicon rubber sheet 55 is arranged so that heat and pressure can be uniformly applied to the battery element 32c.

EXAMPLES

Now, Examples in which polymer electrolyte batteries to which the present invention is applied are actually manufactured and a Comparative Example in which a polymer electrolyte battery is manufactured to compare this battery with the batteries of the Examples will be described on the basis of specific experimental results.

Example 1

[Manufacture of Cathode]

As components of a cathode composite mixture, $LiCoO_2$ of 92 parts by weight as a cathode active material, powdered graphite of 5 parts by weight as a conductive material and powdered polyvinylidene fluoride of 3 parts by weight as a binding agent were measured and used. Then, these components were dispersed in N-methyl pyrrolidone to prepare the slurry of the cathode composite mixture.

The cathode composite mixture thus prepared was uniformly applied to both the surfaces of a cathode current collector made of an aluminum foil (having the thickness of 20 m), and then dried under reduced pressure at the temperature of 100° C. for 24 hours so that cathode active material layers were formed. Then, the cathode active material layers were compression-molded by using a roll press machine to form a cathode sheet. After that, the cathode sheet was cut to manufacture a band shape cathode having length of 50 mm and width of 300 mm. As a cathode lead, an aluminum ribbon was welded to a part of the cathode current collector to which the cathode active material was not applied.

[Manufacture of Anode]

As components of an anode composite mixture, artificial graphite of 91 parts by weight as an anode active material and powdered polyvinylidene fluoride of 9 parts by weight as a binding agent were measured and taken. Then, these components were dispersed in N-methyl pyrrolidone to prepare the slurry of the anode composite mixture.

The anode composite mixture thus prepared was uniformly applied to both the surfaces of an anode current collector made of a copper foil (having the thickness of 15 m), and then dried under reduced pressure at the temperature of 120° C. for 24 hours so that anode active material layers were formed. Then, the anode active material layers were compression-molded by using a roll press machine to form an anode sheet. After that, the anode sheet was cut to manufacture a band shape anode having length of 52 mm and width of 320 mm. As an anode lead, a nickel ribbon was welded to a part of the anode current collector to which the anode active material was not applied.

[Manufacture of Polymer Electrolyte]

As the respective components of a plasticizer, ethylene carbonate of 42.5 parts by weight and propylene carbonate of 42.5 parts by weight as nonaqueous solvent, $LiPF_6$ of 15 parts by weight as electrolyte salt were measured and used. Then, these components were mixed together to prepare the plasticizer.

Subsequently, as the respective components of polymer solution, the plasticizer of 30 parts by weight, polyvinylidene fluoride-co-hexafluoro propylene of 10 parts by weight and dimethyl carbonate of 60 parts by weight were measured and employed. Then, these components were mixed and dissolved to prepare polymer electrolyte solution.

[Manufacture of Polymer Electrolyte Battery]

After the polymer electrolyte solution prepared as described above was applied to the cathode active materials on both the surfaces of the cathode and to the anode active materials on both the surfaces of the anode, these active materials were left under an environment at ambient temperature for 8 hours, and dimethyl carbonate was vaporized and removed so that gel electrolyte layers (having the thickness of 100 m) were formed.

Then, the band shape cathode on which the gel electrolyte layers were formed and the band shape anode on which the gel electrolyte layers were formed were laminated through a separator made of porous polyolefine, and the laminated body was coiled longitudinally to obtain a flat type battery element. This flat type battery element was sandwiched in between by outer package films and the outer peripheral edges of the outer package films were heat-sealed under reduced pressure. Thus, the flat type battery element was sealed in the outer package films. As the outer package film, was employed a film having an aluminum foil sandwiched in between a pair of polyolefine resin films.

Subsequently, the flat type battery element sealed in the outer package films was formed by a thermocompression bonding process of 10 kgf/cm$^2$ for 5 minutes under an environment at the temperature of 85° C. by employing a heat press machine having a recessed heater block and a protruding heater block so that a polymer electrolyte battery whose section perpendicular to a coiling axis had a curved form was obtained.

Example 2

A polymer electrolyte battery was manufactured in the same manner as that of the Example 1 except that a flat type battery element sealed in outer package films was subjected to a thermocompression bonding process by using a heat press machine including a recessed heater block and a flat surface type heater block so that the section of the battery element perpendicular to a coiling axis had a substantially semicircular form.

Example 3

A polymer electrolyte battery was manufactured in the same manner as that of the Example 1 except that a flat type battery element sealed in outer package films was subjected to a thermocompression bonding process by using a heat press machine including a recessed heater block having a flat surface part in the central part of a curved surface part and a silicon rubber sheet with the thickness of 1 mm stuck thereto and a protruding heater block having a flat surface part in the central part of a curved surface part so that the section of the battery element perpendicular to a coiling axis had a curved form having a flat part at least in a part thereof.

Example 4

A polymer electrolyte battery was manufactured in the same manner as that of the Example 1 except that a flat type battery element sealed in outer package films was subjected to a thermocompression bonding process by using a heat press machine including a recessed heater block having a flat surface part in the central part of a curved surface part and a silicon rubber sheet with the thickness of 1 mm stuck thereto and an entirely flat plate type heater block so that the section of the battery element perpendicular to a coiling axis had a substantially semicircular form having a flat part at least in a part of a substantially circular arc part.

Comparative Example 1

A polymer electrolyte battery was manufactured in the same manner as that of the Example 1 except that a flat type battery element sealed in outer package films was subjected to a thermocompression bonding process by using a heat press machine including a pair of flat surface type heater blocks so that the section of the battery element perpendicular to a coiling axis had a substantially rectangular form.

A charging and discharging test was carried out to the respective polymer electrolyte batteries of the Example, 1, the Example 2 and the Comparative Example 1 manufactured as described above to evaluate battery characteristics. The theoretical capacity of each of the polymer batteries of the Example 1, the Example 2 and the Comparative Example 1 is 600 mAh.

[Charging and Discharging Test]

Initially, after a constant-current and constant-voltage charging operation of 1C (600 mA) and 4.2 V was carried out, a constant-current discharging operation of 1C with 3V cut off was carried out to measure an initial discharging capacity.

Then, charging and discharging cycles were repeated 500 times to measure a discharging capacity after 500th cycle. Then, the ratio of the discharging capacity after the 500th cycle relative to the initial discharging capacity was obtained and it was considered to be a discharging capacity maintaining/retention ratio.

The above-described measured results are shown in Table 1.

TABLE 1

|  | Initial Discharging Capacity (mAh) | Capacity Maintaining/retention Ratio (%) |
| --- | --- | --- |
| Example 1 | 592 | 83 |
| Example 2 | 590 | 81 |
| Example 3 | 593 | 83 |
| Example 4 | 591 | 82 |
| Comparative Example 1 | 591 | 82 |

As apparent from the Table 1, the polymer electrolyte batteries of the Examples 1 to 4 has a high discharging capacity and excellent cyclic characteristics similar to those of the polymer electrolyte battery of the Comparative Example 1.

Therefore, it was understood that even when the flat type battery element having the cathode and the anode coiled through the polymer electrolyte was subjected to the thermocompression bonding process by the above-described heat press machine so that the section of the battery element perpendicular to the coiling axis had an epoch-making form such as the curved form or the substantially semicircular form in the polymer electrolyte battery, the battery characteristics were effectively maintained.

INDUSTRIAL APPLICABILITY

Since the polymer electrolyte battery according to the present invention includes the battery element having the cathode and the anode coiled through the polymer electrolyte in which the section of the battery element perpendicular to the coiling axis has the curved form, the above-described battery of the present invention is extremely low in its possibility of short-circuit at the end of the electrode and good in its battery characteristics, as compared with the polymer electrolyte battery having the flat plate type battery element bent.

The invention is claimed is:

1. A polymer electrolyte battery comprising:
a wound battery element having a cathode comprising an elongated cathode collector having two sides on which cathode active material layers are formed, an anode comprising an elongated anode collector having two sides on which anode active material layers are formed, and a polymer electrolyte formed between said cathode and said anode and extending between opposite longitudinal sides and opposite rounded lateral sides;
wherein a section of the longitudinal sides of the battery element perpendicular to the wound axis has a substantially curved form between said opposite rounded lateral sides and the curves of each longitudinal side are parallel to each other;
wherein the battery element is substantially enclosed by a laminate film;
wherein the laminate film has a substantially curved form wherein a portion of the curved form is generally flat; and
wherein the laminate film comprises an aluminum foil sandwiched between a pair of polyolefine resin films.

2. The polymer electrolyte battery according to claim 1, wherein the polymer electrolyte is a gel electrolyte.

3. A polymer electrolyte battery comprising:
a wound battery element including a cathode comprising an elongated cathode collector having two sides on which cathode active material layers are formed, an anode comprising an elongated anode collector having two sides on which anode active material layers are formed, and a polymer electrolyte formed between said cathode and said anode, the battery element further including a first longitudinal surface and an opposite second longitudinal surface;
wherein the first longitudinal surface is generally perpendicular to the wound axis and has a substantially semicircular form;
wherein the second longitudinal surface is generally parallel to the wound axis and has a substantially straight form; and
wherein a laminate film substantially encloses the battery element and the laminate film comprises an aluminum foil sandwiched between a pair of polyolefine resin films.

4. The polymer electrolyte battery according to claim 3, wherein the polymer electrolyte is a gel electrolyte.

5. The polymer electrolyte battery according to claim 3, wherein the first surface outwardly extends in a direction perpendicular to said wound axis.

6. A polymer electrolyte battery including
a wound battery element, with opposite longitudinal sides and opposite rounded lateral sides, having
a cathode comprising an elongated cathode collector having two sides on which cathode active material layers are formed,
an anode comprising an elongated anode collector having two sides on which anode active material layers are formed,
and a polymer electrolyte,
wherein a section of one longitudinal side in a section of the battery element perpendicular to the wound axis and between said opposite rounded lateral sides has a curved form which is a protruding form to a circumference direction and a section of the other longitudinal side has a substantially straight line form between said opposite rounded lateral sides;
wherein the battery element is substantially enclosed by a laminate film;
wherein the laminate film has a substantially curved form wherein a portion of the curved form is generally flat; and wherein the laminate film comprises an aluminum foil sandwiched between a pair of polyolefine resin films.

7. A polymer electrolyte battery comprising:

a wound battery element having a cathode comprising an elongated cathode collector having two sides on which cathode active material layers are formed, an anode comprising an elongated anode collector having two sides on which anode active material layers are formed, and a polymer electrolyte formed between said cathode and said anode and extending between opposite longitudinal sides and opposite rounded lateral sides;

wherein a section of the battery element perpendicular to the wound axis has a substantially curved form between said opposite rounded lateral sides and the curves of each longitudinal side are parallel to each other;

wherein the battery element is substantially enclosed by a laminate film; and wherein the laminate film comprises an aluminum foil sandwiched between a pair of polyolefine resin films.

8. A polymer electrolyte battery comprising:

a wound battery element having a cathode comprising an elongated cathode collector having two sides on which cathode active material layers are formed, an anode comprising an elongated anode collector having two sides on which anode active material layers are formed, and a polymer electrolyte formed between said cathode and said anode and extending between opposite longitudinal sides and opposite rounded lateral sides;

wherein a section of the battery element perpendicular to the wound axis has a substantially curved form between said opposite rounded lateral sides and the curves of each longitudinal side are parallel to each other; and wherein a laminate film substantially encloses the battery element and the laminate film comprises an aluminum foil sandwiched between a pair of polyolefine resin films.

* * * * *